(12) United States Patent
Gudde

(10) Patent No.: US 8,552,234 B2
(45) Date of Patent: Oct. 8, 2013

(54) HYDROGENATION PROCESS

(75) Inventor: Nicholas John Gudde, Surrey (GB)

(73) Assignee: BP Oil International Limited, Middlesex (GB)

(*) Notice: Subject to any disclaimer, the term of this patent is extended or adjusted under 35 U.S.C. 154(b) by 676 days.

(21) Appl. No.: 12/311,497

(22) PCT Filed: Oct. 4, 2007

(86) PCT No.: PCT/GB2007/003767
§ 371 (c)(1),
(2), (4) Date: Apr. 1, 2009

(87) PCT Pub. No.: WO2008/040980
PCT Pub. Date: Apr. 10, 2008

(65) Prior Publication Data
US 2010/0069690 A1 Mar. 18, 2010

(30) Foreign Application Priority Data

Oct. 6, 2006 (EP) .................................... 06255166
Jul. 6, 2007 (GB) .................................... 0713190.7

(51) Int. Cl.
*C10G 1/00* (2006.01)
(52) U.S. Cl.
USPC ........... 585/240; 585/469; 585/638; 585/639; 585/640; 585/733; 585/752; 44/307; 44/308; 44/605; 44/606
(58) Field of Classification Search
USPC .................... 585/240, 700, 733, 752; 44/605
See application file for complete search history.

(56) References Cited

U.S. PATENT DOCUMENTS

| | | | | |
|---|---|---|---|---|
| 4,362,613 A * | 12/1982 | MacLean | ...................... | 208/108 |
| 5,599,955 A | 2/1997 | Vora et al. | | |
| 5,705,722 A * | 1/1998 | Monnier et al. | .............. | 585/240 |
| 2004/0230085 A1 | 11/2004 | Jakkula et al. | | |
| 2006/0122449 A1 | 6/2006 | Van Egmond | | |
| 2006/0186020 A1 | 8/2006 | Gomes | | |
| 2007/0175795 A1 * | 8/2007 | Yao et al. | ...................... | 208/142 |

FOREIGN PATENT DOCUMENTS

WO    WO 2006/075057    7/2006

OTHER PUBLICATIONS

Martin, E. (2010). The Dictionary of Science, UOP, 912 pgs.*
Anonymous: "Le Chatelier's principle" Wikipedia, The Free Encyclopedia, [Online], XP002423236.
International Search Report for PCT/GB2007/003767, mailed Jan. 17, 2008.

(Continued)

*Primary Examiner* — Brian McCaig
(74) *Attorney, Agent, or Firm* — Nixon & Vanderhye

(57) ABSTRACT

Process for producing hydrocarbons from a carboxylic acid by feeding hydrogen and a reaction composition containing a carboxylic acid to a reactor, maintaining reaction conditions such that the hydrogen reacts with the carboxylic acid to produce a $C_1$ compound including CO, $CO_2$ and $CH_4$, and one or more product hydrocarbons derived from the carboxylic acid. The reaction between hydrogen and the carboxylic acid is catalysed. A product stream is removed from the reactor including unreacted hydrogen, at least one $C_1$ compound, and at least one product hydrocarbon. One or more parameters of the reaction are controlled such that the molar ratio of $C_1$ compounds produced by the reaction to the carboxylate groups present in the carboxylic acid in the reaction composition is maintained above a value of 0.37:1, and the mole ratio of carbon dioxide to the sum of carbon monoxide and methane is maintained above a value of 0.58:1.

18 Claims, 2 Drawing Sheets

(56) References Cited

OTHER PUBLICATIONS

Written Opinion of the International Searching Authority for PCT/GB2007/003767, mailed Jan. 17, 2008.

Laurent, E., et al; "Study of the hydrodeoxygenation of carbonyl, carboxylic and guaiacyl groups over sulfide CoMo/$\gamma$-Al$_2$O$_3$ and NiMo/$\gamma$-Al$_2$O$_3$ catalysts. I. Catalytic reaction schemes"; *Applied Catalysis A.*; vol. 109, pp. 77-96 (1994).

* cited by examiner

HYDROGENATION PROCESS

This application is the U.S. national phase of International Application No. PCT/GB2007/003767, filed 4 Oct. 2007, which designated the U.S. and claims priority to Europe Application No. 06255166.8, filed 6 Oct. 2006, and Great Britain Application No. 0713190.7, filed 6 Jul. 2007, the entire contents of each of which are hereby incorporated by reference.

This invention relates to the field of hydrogenation, more specifically to a process for the hydrogenation of a carboxylic acid and/or derivative thereof to produce one or more hydrocarbons.

BACKGROUND OF THE INVENTION

It is widely believed that increased concentrations of atmospheric carbon dioxide ($CO_2$) can contribute to global warming. The burning of fossil fuels is thought to be chiefly responsible for such atmospheric increases, and governments are beginning to set targets for regulating or reducing anthropogenic carbon dioxide emissions in an attempt to mitigate and reduce such effects.

Liquid fuels, such as gasoline, liquefied petroleum gas (LPG), diesel and aviation fuels, are major sources of atmospheric carbon dioxide emissions. In the main, they are derived from fossil fuels such as crude oil, natural gas and coal. Natural gas and coal, for example, can be converted to syngas through processes such as steam reforming or partial oxidation in which the syngas is subsequently converted into liquid hydrocarbon products by Fischer Tropsch synthesis. Crude oil is typically distilled into various fractions based on different boiling points in a refinery, which fractions can either be used as fuels directly, or after further conversion.

One approach for reducing human-related contributions to atmospheric $CO_2$ concentrations is to use biomass as a fuel, or to prepare fuels from a biomass source. Biomass is ultimately produced from atmospheric carbon dioxide through photosynthesis and related processes, hence any $CO_2$ released on combustion will have been originally derived from the atmosphere. The fuels can therefore be regarded as $CO_2$-neutral.

An example of biomass-derived fuel is biodiesel. One type of biodiesel comprises a blend of regular fossil fuel-derived diesel and a biological oil (bio-oil). However, use of biological oils directly as a fuel is not always desirable as they can cause engine fouling through coking or polymerisation, and can contaminate the engine lubricant, reducing its effectiveness.

Biological oils are chiefly comprised of fatty acid triglycerides, and they can be converted into hydrocarbons corresponding to the fatty acid hydrocarbon chains. One way in which this is achieved is to react the bio-oil with hydrogen, in a process often referred to as hydrodeoxygenation. Such processes are exemplified by U.S. Pat. No. 4,992,605, which describes the hydrogenation of vegetable oils to produce hydrocarbons in the diesel boiling range, and U.S. Pat. No. 5,705,722, which relates to the production of hydrocarbons through the hydrogenation of biological oils, and blending the hydrocarbons with diesel fuel. WO 2006/075057 also describes a process for producing diesel fuel hydrocarbons from fatty acid triglycerides, in which the diesel fuel hydrocarbons have one less carbon than the fatty acid chains of the triglycerides in the feedstock.

Another hydrodeoxygenation process has been described by Baldauf & Balfanz in VDE Reports No 1126 (1994) pp 153-168, in which biologically-derived oils can be co-fed with a mineral oil feedstock to a refinery hydrodesulphurisation unit, wherein the mineral oil is hydrodesulphurised and the biological oil hydrodeoxygenated simultaneously to produce a diesel fuel.

A problem with such a combined hydrodesulphurisation and hydrodeoxygenation process is that biological oils require greater quantities of hydrogen in order to be hydrodeoxygenated to hydrocarbons compared to the quantities of hydrogen required to hydrodesulphurise diesel fuel.

Thus, there remains a need for an improved process for hydrogenating biological oils to produce hydrocarbon fuels in which the consumption of hydrogen is reduced.

SUMMARY OF THE INVENTION

According to the present invention, there is provided a process for producing hydrocarbons from a carboxylic acid and/or derivative thereof, which process comprises the steps of (a) feeding hydrogen and a reaction composition comprising a carboxylic acid and/or derivative thereof to a reactor;

(b) maintaining conditions within the reactor such that the hydrogen reacts with the carboxylic acid and/or derivative thereof to produce one or more $C_1$ compounds selected from one or more of carbon monoxide (CO), carbon dioxide ($CO_2$) and methane ($CH_4$), and one or more product hydrocarbons derived from the carboxylic acid and/or derivative thereof;

(c) removing from the reactor a product stream comprising unreacted hydrogen, the one or more product hydrocarbons, and the one or more $C_1$ compounds from the reactor;

characterised in that the molar ratio of $C_1$ compounds produced by the reaction to the carboxylate groups present in the carboxylic acid and/or derivative thereof in the reaction composition is maintained at a value of greater than 0.37:1.

Without being bound by any theory, it is believed that hydrodeoxygenation of a carboxylic acid and/or derivative thereof can follow at least two reaction pathways, which are shown below in equations I and II. The carboxylic acid and/or derivative thereof represented in these equations is a fatty acid triglyceride, which is usually the major constituent of biological oils and fats.

In equation I, oxygen from the carboxylate group of the triglyceride is removed in the form of carbon dioxide. As a result, the product hydrocarbon, $R^1H$, does not comprise the carboxyl carbon.

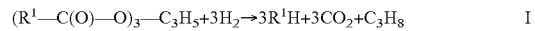
$$(R^1\text{---}C(O)\text{---}O)_3\text{---}C_3H_5 + 3H_2 \rightarrow 3R^1H + 3CO_2 + C_3H_8 \qquad \text{I}$$

In equation II, oxygen is removed as water, and the product hydrocarbon $R^1CH_3$ includes the carboxyl carbon.

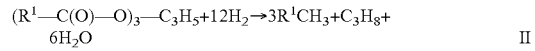
$$(R^1\text{---}C(O)\text{---}O)_3\text{---}C_3H_5 + 12H_2 \rightarrow 3R^1CH_3 + C_3H_8 + 6H_2O \qquad \text{II}$$

Other reactions that are thought to occur in the reactor are the reduction of $CO_2$ to carbon monoxide and methane, according to reactions III and IV.

$$CO_2 + H_2 \rightarrow CO + H_2O \qquad \text{III}$$

$$CO + 3H_2 \rightarrow CH_4 + H_2O \qquad \text{IV}$$

From these equations, it is apparent that equation would consume less hydrogen to produce hydrocarbons. However, from thermodynamic considerations, favouring equation I over equation II, for example by lowering hydrogen partial pressure, would also be expected to result in lower conversions of the carboxylic acid and/or derivative thereof to the one or more product hydrocarbons.

The inventors have now found that hydrogen consumption can be reduced with little or no impact on the conversion of carboxylic acid and/or derivative thereof to product hydrocarbons by controlling the process so as to maintain the mole ratio of $C_1$ compounds in the product stream to the number of carboxylate groups in the reaction composition at or above a pre-determined value.

In the process of the present invention, hydrogen is fed to a reactor together with a reaction composition comprising carboxylic acid and/or derivative thereof. Conditions in the reactor are maintained such that the carboxylic acid and/or derivative thereof reacts with the hydrogen to produce one or more product hydrocarbons. A product stream comprising the one or more product hydrocarbons, unreacted hydrogen, and one or more $C_1$ compounds selected from one or more of CO, $CO_2$ and $CH_4$ is removed from the reactor.

In a preferred embodiment, vapour and liquid phase components of the product stream are separated using a flash separator, in which a vapour fraction of the product stream comprising the $C_1$ compounds and unreacted hydrogen is separated from a liquid fraction of the product stream comprising the product hydrocarbons. Carboxylic acids and/or derivatives thereof used in the process of the present invention are typically in the liquid phase under the conditions of temperature in the reactor, and typically form part of the liquid fraction removed from the flash separator. Separation of vapour phase components from liquid phase components allows hydrogen to be recycled to the reactor, thus improving hydrogen utilisation and reducing waste.

In the present invention, high conversions of the carboxylic acid and/or derivative thereof to the one or more product hydrocarbons can be achieved by maintaining the molar ratio of $C_1$ compounds present in the product stream to the carboxylate groups present in the carboxylic acid and/or derivative thereof fed to the reactor at a value of greater than 0.37:1. This ratio will henceforth be referred to as the $C_1$:carboxylate ratio. More preferably the ratio is greater than 0.45:1, for example greater than 0.5:1. In one embodiment, the $C_1$:carboxylate mole ratio is maintained at a value of greater than or equal to 0.57:1.

In addition, the mole ratio of $CO_2$ compared to the other $C_1$ compounds (CO and $CH_4$) can also be used to control hydrogen consumption in the process. Preferably, the mole ratio of $CO_2$:(CO+$CH_4$) is maintained at a value of greater than 0.58:1, for example greater than 1:1. In one embodiment, it is maintained at a value of greater than or equal to 1.3:1.

In processes involving control of the process from measurement of the concentration or relative concentration of the $C_1$ components, the $C_1$ concentrations can be measured in the vapour fraction of the flash separator, using techniques such as gas chromatography or optical techniques such as IR or NIR spectroscopy. On-line techniques can optionally be used to minimise delays and the potential for contamination that can be associated with manual sampling and analysis.

Further control over hydrogen consumption can also be achieved by maintaining the mole ratio of product hydrocarbons of formula $R^1H$ to product hydrocarbons of formula $R^1CH_3$ (the $R^1H:R^1CH_3$ mole ratio) at a value preferably of 1:1 or more.

The molar ratio of the product hydrocarbons in the product stream or liquid fraction thereof from the flash separator can be determined by techniques such as liquid or gas chromatography. On-line techniques can optionally be used to minimise delays and the potential for contamination that can be associated with manual sampling and analysis.

The reaction can be catalysed. Suitable catalysts include those that are typically used in refinery-related hydrotreating reactions such as hydrodesulphurisation. Examples of suitable catalysts include those comprising one or more of Pd, Pt, Ni, Ru, Cu, Cr, Fe, Co, Mo and W, preferably catalysts comprising Ni or Co in combination with Mo. The catalyst is typically supported on an inorganic oxide such as silica, zirconia, titania or gamma-alumina, preferably gamma-alumina.

Variables that influence the molar ratios ($CO_2$+CO+$CH_4$):carboxylate, of $CO_2$:(CO+$CH_4$) and of $R^1H:R^1CH_3$ include the total pressure in the reactor, the hydrogen partial pressure in the reactor, the reaction temperature, and the molar ratio of carboxylate groups to hydrogen in the reactor. For example, higher carboxylate to hydrogen mole ratios and lower hydrogen partial pressures tend to favour an increased ($CO_2$+CO+$CH_4$):carboxylate mole ratio. Additionally, although $CO_2$:(CO+$CH_4$) mole ratios also tend to increase with lower hydrogen partial pressures, hydrogenation tends to increase with increased reaction temperature. The space velocity of the reaction composition, and hence the carboxylic acid and/or derivative thereof, over the catalyst can also be varied to control the molar ratios. Lower space velocities, for example, tend to increase the extent of hydrodeoxygenation, and hence the quantity of $C_1$ compounds in the product stream. Additionally, lower space velocities tend to reduce the $CO_2$:(CO+$CH_4$) molar ratio in the product stream.

The reaction temperature is preferably maintained at or above 200° C. in order to maintain activity, while it is preferably maintained at or below 430° C. to reduce unwanted side-reactions and production of by-products. Typically, the reaction temperature is in the range of from 300 to 400° C., such as in the range of from 350 to 400° C.

The total pressure in the reactor is preferably less than 100 bara (10 MPa), and more preferably less than 50 bara (5 MPa). In one embodiment of the invention, the pressure is 31 bara or less (3.1 MPa). To maintain sufficient conversions, a pressure of at least 1 bara (0.1 MPa) is typically maintained, such as 10 bara (1 MPa).

The space velocity of the reaction composition comprising the one or more carboxylic acids and/or derivatives thereof is suitably measured in terms of liquid hourly space velocity (LHSV), as the carboxylic acids and/or derivatives thereof are typically in the liquid phase under conditions within the reactor. Preferably, the LHSV is up to 4 h$^{-1}$ (volume of all liquid/volume catalyst/hour), for example in the range of from 1 to 4 h$^{-1}$.

Catalyst choice is another parameter which can be used to influence the molar ratios. For example, supported CoMo catalysts, in particular CoMo on alumina catalysts, are effective in catalysing hydrodecarboxylation at lower pressures, for example pressures of less than 50 bara (5 MPa) and 31 bara (3.1 MPa) or less, which generally increases the $C_1$:carboxylate mole ratio.

In one embodiment, the vapour fraction from the flash separator is treated to remove carbon dioxide. An absorbing material can be used in order to achieve this, for example a liquid amine such as mono- or di-ethanolamine, or a solid basic oxide such as an alkali metal or alkaline earth metal modified zeolite or solid oxide. The absorbent can then be regenerated for re-use, such as by thermal or chemical treatment. The remaining, unabsorbed gases, including the unreacted hydrogen, can then be recycled back to the reactor. Removal of carbon dioxide in this way is advantageous as it allows a smaller purge to be taken before recycle to the reactor, which helps to improve the hydrogen efficiency of the process. Separated carbon dioxide can optionally be captured for sequestration, reducing the contribution of the process to atmospheric $CO_2$ concentrations.

In another embodiment of the invention, the vapour fraction is contacted with a selectively permeable membrane, which allows the selective separation of hydrogen from the other components of the flash separator. The hydrogen stream resulting from the permeation is of very high purity, and can thus be recycled to the reactor without the need for a purge stream. Membranes suitable for use in such an embodiment are known, for example in WO 05/065806 or EP-A-1 342 500. Typically, membranes comprise a layer of metal such as palladium or palladium-silver alloy coated on a porous ceramic matrix, for example $\gamma$-$Al_2O_3$, $ZrO_2$, $SiO_2$ or $CeO_2$.

By converting the carboxylic acid and/or derivative thereof into hydrocarbons typically present in existing fuel compositions, then the hydrocarbons so-produced can be used directly as a fuel, or alternatively can be blended or otherwise incorporated into an existing mineral fuel, for example diesel, gasoline or aviation fuel, depending on the boiling range and/or number of carbon atoms in the hydrocarbons. This avoids the need to modify engines or other combustion equipment that may otherwise be required if unreacted carboxylic acid and/or derivative thereof are used. Lighter hydrocarbons, such as methane and propane that may also result from the process of the present invention, can also be incorporated into a fuel product. For example propane produced from a triglyceride during hydrodeoxygenation can be blended with propane produced in a crude oil refinery or from compression of natural gas. Alternatively, any by-products that cannot be captured or separated in sufficient purity can be combusted in order to obtain power or heat. This is conveniently achieved by feeding it as fuel to an on-site power station or combined heat and power generator, for example.

The carboxylic acid and/or derivative thereof is an organic compound represented by general formula $R^1C(O)O$—$R^2$. In a carboxylic acid, the carboxylate unit is protonated, and thus $R^2$=H. A derivative of the carboxylic acid is a compound that can liberate the corresponding carboxylic acid when hydrolysed, for example an ester or an anhydride. Included in this definition are compounds comprising more than one carboxylate group, for example di-carboxylic acids, di-esters, or di- or tri-glycerides.

The carboxylic acid and/or derivative thereof is preferably chosen such that the boiling point characteristics and/or the number of carbon atoms in the hydrocarbons resulting from their hydrogenation are in the same range as those of the target fuel product. For example, diesel fuels typically comprise hydrocarbons with in the range of from 10 to 25 carbon atoms. In a preferred embodiment of the invention, fatty acids and/or their esters are used, which typically have a long hydrocarbon chain as the $R^1$ group. Examples of fatty acids and/or esters suitable for producing hydrocarbons suitable for use as diesel fuel include, lauric, myristic, palmitic, stearic, linoleic, linolenic, oleic, arachidic and erucic acids and/or esters thereof, wherein $R^1$ comprises 11, 13, 15, 17, 17, 17, 17, 19 and 21 carbon atoms respectively. The esters may comprise $R^2$ groups having in the range of from 1 to 6 carbon atoms, for example methyl, ethyl, propyl or butyl, or alternatively the ester may be a mono-, di- or triglyceride, with general formula $[R^1C(O)O]_nC_3H_5(OH)_{3-n}$, where n=1, 2 or 3 for mono-, di- or tri-glycerides respectively. The fatty acids and/or esters thereof may have saturated or unsaturated hydrocarbon groups. Di- or tri-glycerides may comprise hydrocarbon chains derived from the same or different fatty acids. A mixture of more than one carboxylic acid and/or derivative thereof can be fed to the reactor.

In one embodiment of the invention, the carboxylic acid and/or derivative thereof is derived from biomass, being a component for example of plant or animal-derived oil or fat. Use of biologically-derived carboxylic acids and/or esters ensures that the resulting fuel composition has a lower net emission of atmospheric carbon dioxide compared to an equivalent fuel derived purely from mineral sources. Suitable biological sources of fatty acids and/or esters include plant-derived oils, such as rapeseed oil, palm oil, peanut oil, canola oil, sunflower oil, tall oil, corn oil, soybean oil and olive oil. Animal oils or fats, such as fish oil, lard, tallow, chicken fat, or milk and milk-derived products, are also suitable sources of fatty acids and/or esters, as are oils derived from microorganisms, for example microalgae. Waste oils, such as used cooking oils can also be used.

The carboxylic acid and/or derivative thereof may not be the sole constituent of the reaction composition. In one embodiment, the reaction composition also comprises hydrocarbons, henceforth referred to as feedstock hydrocarbons to distinguish them from the product hydrocarbons produced from hydrodeoxygenation of the carboxylic acid and/or derivative thereof. Suitable feedstock hydrocarbons include those derived from refinery process streams, or those derived from Fischer-Tropsch synthesis. In one embodiment, the feedstock hydrocarbons are themselves suitable for use as a fuel, such as gasoline, diesel or aviation fuel. In an alternative embodiment, they may be a relatively crude mixture of hydrocarbons, resulting from a combination of several hydrocarbon process streams. The product stream, comprising the product hydrocarbons, can then be distilled or fractionated to produce one or more hydrocarbon fuels, for example one or more of gasoline, diesel or aviation fuel.

Where the reaction composition comprises feedstock hydrocarbons, they are preferably suitable for producing a diesel fuel. In crude oil refining, diesel fuel is typically derived from a straight-run fraction from a crude distillation unit, although it may optionally alternatively or additionally comprise hydrocarbons produced by other refinery processes, such as steam cracking and/or hydrocracking of heavier crude fractions, for example catalytically cracked vacuum gas oil. Diesel fuels typically comprise hydrocarbons boiling at temperatures in the range of from 150 to 400° C., and having in the range of from 10 to 25 carbon atoms. Refinery-derived diesel fuels additionally often comprise heteroatom-containing components. The process of the present invention is therefore capable of simultaneously hydrotreating the feedstock diesel hydrocarbons to remove some or all of the heteroatom-containing components, and hydrodeoxygenating the carboxylic acid and/or derivative thereof within the same reactor. Optionally the feedstock hydrocarbons can be hydrotreated before forming part of the reaction composition of the present invention, which can allow the conditions in the reactor of the present invention to be optimised for the hydrodeoxygenation reaction as opposed to the hydrotreating reaction for the feedstock hydrocarbons, which may have different optimum operating conditions.

In one embodiment, the feedstock hydrocarbons may be present in a pre-desulphurised diesel fuel stream, which additionally comprises sulphur-containing compounds such as mercaptans, sulphides, thiophenes or benzothiophenes. The reactor is a refinery hydrodesulphurisation reactor, comprising a hydrodesulphurisation catalyst. The carboxylic acid and/or derivative thereof is a biological oil or fat, and is fed to the same reactor as the feedstock hydrocarbons. The biological oil or fat typically comprises up to 50% by weight of the reaction composition, for example in the range of from 0.1 to 50% by weight or in the range of from 1 to 35% by weight. The biological oil or fat can be pre-mixed with the feedstock hydrocarbons or introduced as a separate feed.

A typical diesel fuel feedstock hydrocarbon stream derived from a crude oil refinery typically comprises alkanes, olefins and one or more sulphur-containing compounds. The sulphur-containing compounds are typically present at concentrations of 200 ppm or more, such as 0.1% by weight or more, for example in the range of from 0.2 to 2% by weight, expressed as elemental sulphur. Olefins may be present in the fuel hydrocarbon precursor stream, for example at concentrations of 0.01% or more, and may be up to 20% by weight, for example up to 10% by weight or up to 5% by weight.

After hydrodesulphurisation, either simultaneously or prior to the hydrodeoxygenation of the carboxylic acid and/or derivative thereof, the resulting sulphur content is typically reduced to 200 ppm or less, expressed as elemental sulphur, for example in the range from 0.1 to 200 ppm. Furthermore, olefins concentrations are typically lower than 1 wt %, for example 0.1 wt % or less. Where the hydrodesulphurisation takes place prior to the hydrodeoxygenation reaction, then the above resulting sulphur content relates to that of the feedstock hydrocarbons that form part of the reaction composition. Potentially, during hydrodeoxygenation of the carboxylic acid and/or derivative thereof, the sulphur levels can be further reduced. Where there is no hydrodesulphurisation step prior to the hydrodeoxygenation reaction, then the above resulting sulphur content relates to that of the combined feedstock hydrocarbons and product hydrocarbons in the liquid fraction of the product stream. Olefin levels after hydrodesulphurisation treatment are typically reduced to below detectable quantities.

By combining the carboxylic acid and/or derivative thereof with crude oil-derived hydrocarbon streams in the reaction composition of the present invention, the hydrodeoxygenation process can make use of existing refinery units, for example hydrodesulphurisation reactors, or can be facilely retrofitted thereto, which minimises the quantity of new process equipment required, while at the same time producing product hydrocarbons that can be directly blended with existing fuel stocks with no or minimal compatibility issues.

Where desulphurisation is simultaneous with hydrodeoxygenation, $H_2S$ is formed, which can be removed from the product stream in the vapour fraction from the flash separator. Before recycle of unreacted hydrogen to the reactor occurs, it is advantageously removed, typically through absorption by contact with an amine. Removing $H_2S$ can also simultaneously remove carbon dioxide, which further reduces potential contaminants from the portion of the vapour fraction that is recycled. Carbon dioxide removed in this way can be sequestered, to prevent the $CO_2$ from entering the atmosphere, reducing the $CO_2$ impact of the process on atmospheric $CO_2$ concentrations.

The liquid fraction from the flash separator can optionally be fed to a further separation unit, for example a fractionation or distillation unit, to separate the hydrocarbon mixture into various fuel fractions, for example light hydrocarbons (e.g. LPG), gasoline, diesel or kerosene, or combinations of two or more thereof.

Lowering the partial pressure of hydrogen is advantageous in increasing the $C_1$ to carboxylate mole ratio. However, a problem with low hydrogen partial pressures is that deactivation of the hydrogenation catalysts may occur. Therefore, in one embodiment of the invention where a fixed bed catalyst is used, hydrogen is separately and simultaneously injected at two or more different regions of the catalyst bed. By increasing hydrogen consumption in hydrogen-lean regions of the catalyst bed, catalyst deactivation can be reduced and activity prolonged. In an alternative embodiment, a series of reactors arranged in series can be provided, optionally with a means of separating gases from the product stream between the reactors. Fresh hydrogen and/or recycled hydrogen is fed to each of the reactors, minimising the quantity of catalyst exposed to potentially damaging low partial pressures of hydrogen. In this embodiment, the quantity of catalyst in each of the fixed catalyst beds is typically lower than embodiments comprising a single fixed bed reactor. Gases removed from the product stream between the reactors can be treated to recover hydrogen for recycling, and optionally to remove contaminants such as hydrogen sulphide and carbon dioxide.

In yet another embodiment of the invention, the catalyst is fluidised in the reaction medium, wherein the catalyst is removed, either continuously or batchwise, and regenerated, for example in a stream of carbon dioxide-free hydrogen, and fed back to the reactor in order to maintain catalyst activity.

The liquid fraction comprising product hydrocarbons and optionally feedstock hydrocarbons is optionally and preferably fractionated to provide fuel hydrocarbons of different boiling ranges, at least one of which, and preferably the predominant fraction, is comprises hydrocarbons in the diesel boiling range.

BRIEF DESCRIPTION OF THE DRAWINGS

The invention is now illustrated by the following non-limiting examples, and with reference to the Figures in which;

In FIG. 1, freshly introduced hydrogen 1 is fed to reactor 2 in addition to a liquid feed of biological oil or fat, 4, optionally together with mineral oil-derived feedstock hydrocarbons in the diesel fuel boiling range. Where feedstock hydrocarbons are additionally added, they can be fed to the reactor either through the same inlet as the biological oil, or through a separate inlet. The reactor 2 comprises a fixed catalyst bed 3, which is typically a gamma-alumina supported nickel-molybdenum or cobalt-molybdenum hydrogenation catalyst. A product stream 5 is removed from the reactor and fed to a flash separator 6, operating at a lower pressure compared to the reactor. A vapour fraction 7 comprising carbon dioxide, carbon monoxide, methane, propane, water and unreacted hydrogen is removed from the flash separator and recycled through line 8 to the reactor. A purge stream 9 is taken from the recycle line to prevent build up of unwanted by-products in the reactor. A liquid fraction 10 comprising product hydrocarbons derived from the biological oil or fat and any feedstock hydrocarbons is removed from the flash separator.

In FIG. 2, a carbon dioxide separator 11 is inserted between the purge line 9 and the flash separator 6. The carbon dioxide separator contains an amine which absorbs carbon dioxide, and also some of the water from the vapour fraction of the flash separator 7. The amine is transferred through line 12 to be regenerated and reused. The carbon dioxide separated there from can optionally be sequestered to prevent its release to the atmosphere. The remainder of the vapour fraction is fed back to the reactor through line 8, with a purge 9 to prevent accumulation of unwanted by-products such as carbon monoxide, methane and propane in the recycled hydrogen. The separator 11 can also be used to remove hydrogen sulphide, generated for example from hydrodesulphurisation of mineral oils, where they are a constituent of the reaction composition.

FIG. 3 illustrates a process in which hydrogen is fed to a first reactor 2a, containing a first fixed bed of hydrogenation catalyst 3a, through line 1a. Biological oil or fat is also fed to the reactor 3a though line 4a. A mineral oil comprising hydrocarbons in the diesel fuel boiling range is optionally also added to the reactor, either through the same inlet 4a as the biological oil or fat, or through a different inlet. The first product stream 5a is passed on to a first flash separator 6a. A first vapour fraction is removed through line 7a and passed to carbon dioxide separator 11. A first liquid fraction, comprising product hydrocarbons and unreacted biological oil or fat, is passed on through line 4b to second reactor 2b with a second fixed bed hydrogenation catalyst 3b. A second product stream, richer in product hydrocarbons derived from biological oil or fat than the first product stream is fed to second flash separator 6b, where a vapour fraction is removed through line 7b and passed on to carbon dioxide separator 11. A second liquid fraction 10 comprising the hydrocarbons is removed from the flash separator. Carbon dioxide and at least some water is removed from the combined first and second vapour fractions by the carbon dioxide separator using an amine. Hydrogen sulphide, if a constituent of the vapour fractions, is also removed in the separator. The amine is removed from the separator through line 12 for regeneration and optionally carbon dioxide retrieval and storage. The remaining unabsorbed hydrogen-containing vapour fraction is removed through line 8 and recycled to the first and second reactors via line 8, with a purge 9 to prevent build up of unwanted impurities.

FIG. 4 shows schematically the apparatus used for performing the experiments described below. Hydrogen is fed through line 20 to reactor 23. A liquid oil feed, comprising mineral oil and/or biological oil is fed from liquid store 21 via pump 22 into the reactor feed line 20. The reactor has a volume of 114 mL and an internal diameter of 14.7 mm, and is loaded with cobalt-alumina catalyst 24. Reactor products are fed via line 25 to a flash separator 26, from which a vapour fraction is extracted through line 27 and a liquid fraction is extracted through line 29. The vapour and liquid fraction flow rates are controlled using pressure control valves 28 and 30, which also control the pressure within the flash separator.

EXAMPLE 1

A liquid feed mixture of 69.74 wt % decalin ($C_{10}H_{18}$), 0.26 wt % dimethyl disulphide (DMDS) and 30 wt % tallow oil was prepared. The tallow oil comprised fatty acid chains with 12 to 22 carbon atoms (including the carboxyl carbon), predominantly comprising molecules with 16 or 18 carbon atoms in the fatty acid chain (including the carboxyl carbon).

Figure 1:
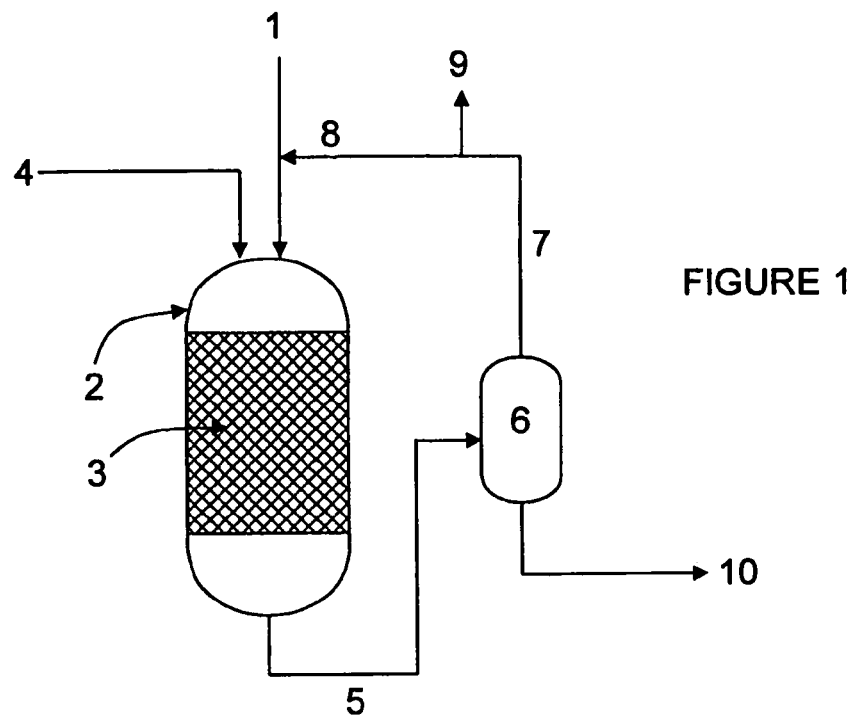
FIG. 1 schematically illustrates a hydrodeoxygenation process in accordance with the present invention, in which showing recycling of the vapour fraction from the flash separator to the reactor.
Figure 2:
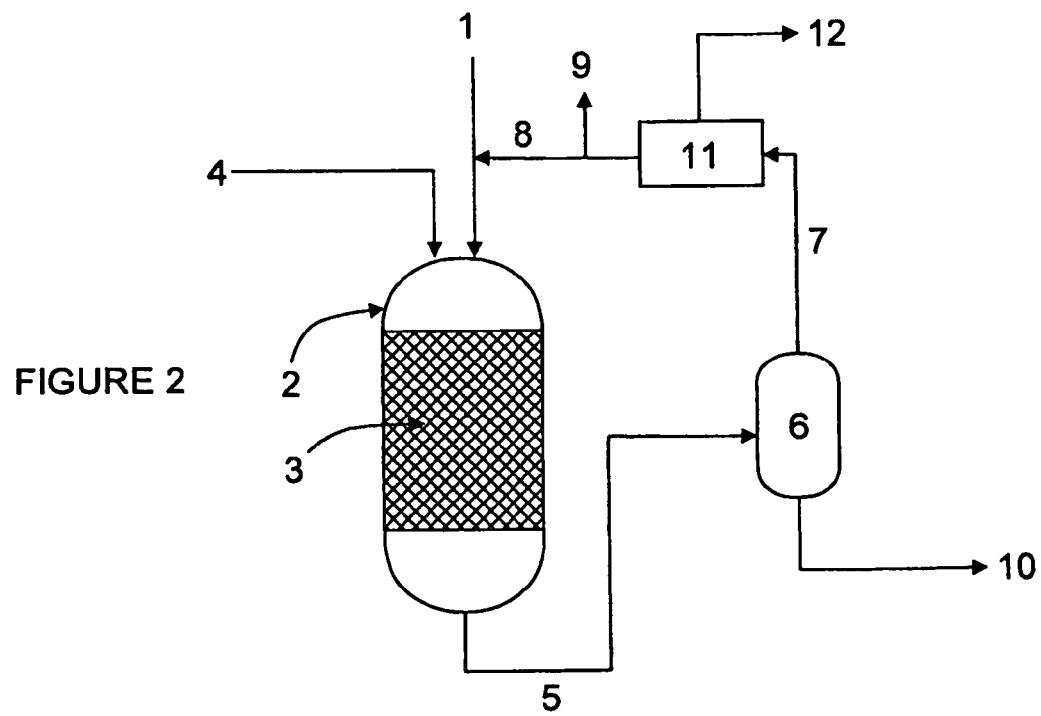
FIG. 2 schematically illustrates a different hydrodeoxygenation process in accordance with the present invention, in which carbon dioxide is separated from the recycled vapour fraction.
Figure 3:
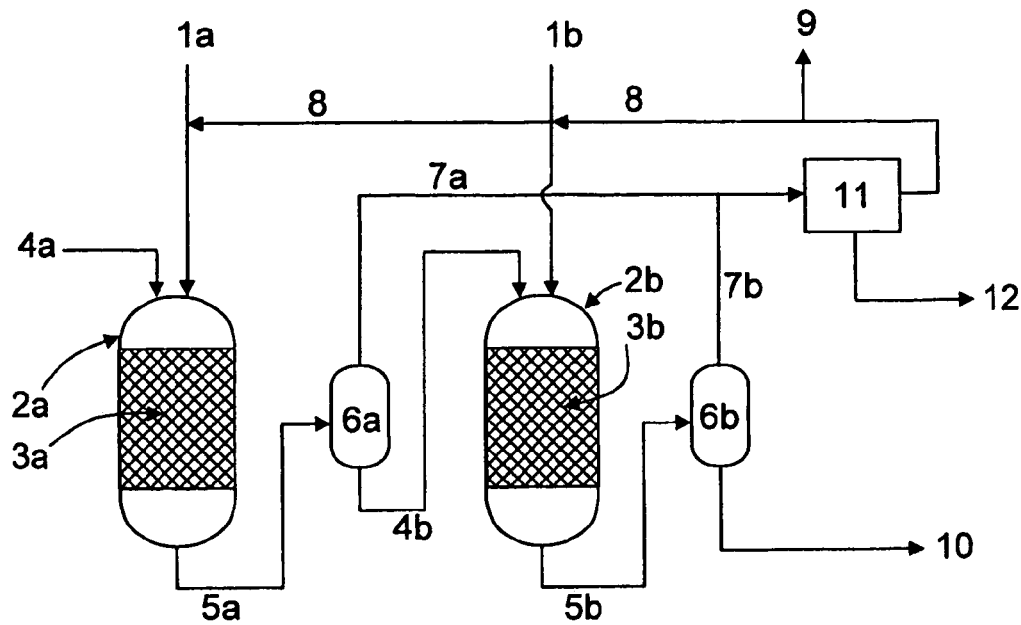
FIG. 3 schematically illustrates a further hydrodeoxygenation process in accordance with the present invention in which hydrogen is injected into the reactor at different depths of a fixed catalyst bed.
Figure 4:
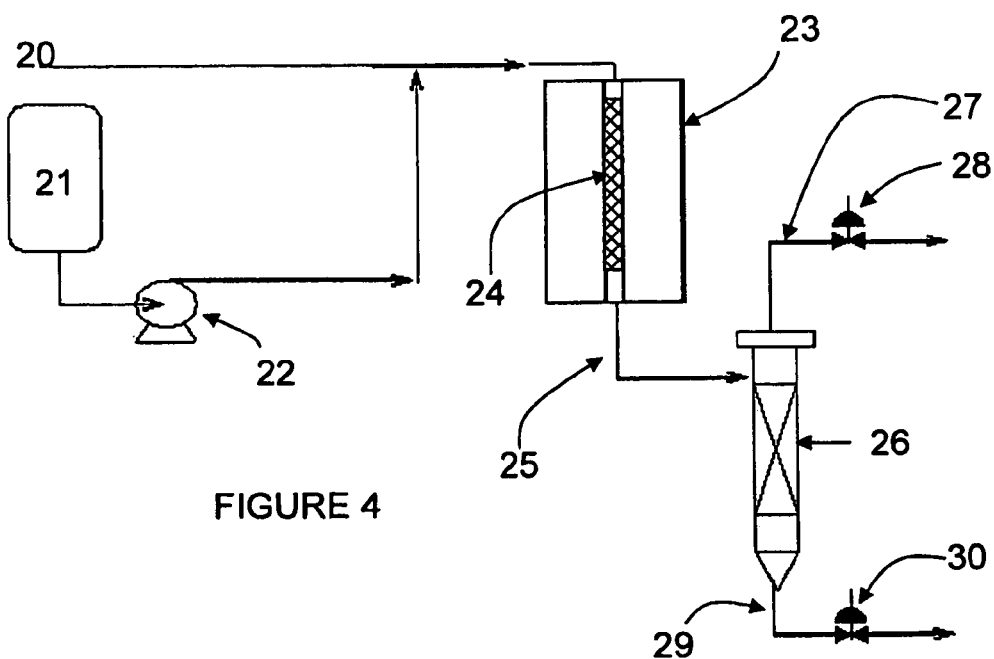
FIG. 4 shows schematically the apparatus used in the experimental examples.

The liquid mixture was fed to a reactor as illustrated in FIG. 4, operating at 363° C. and 30 barg (3.1 MPa) pressure, at a feed-rate of 60 mL/hour. A cobalt-molybdenum on alumina catalyst was used that was pre-sulphided using a diesel fuel comprising 4% Lubrizol SZ54 sulphiding agent. The catalyst was also pre-conditioned by contacting it, under the reaction conditions given below, with a refinery gas oil composition over a period of 4 days. The gas oil had a relative density of 0.986, and contained 1830 ppm sulphur and 104 ppm nitrogen. Using method ASTM D2887, it had a 10% boiling point of 236° C. and a 90% boiling point of 370° C.

The gas oil conditioning feed was then replaced with the decalin/tallow/DMDS composition. For the conditioning step and the tallow oil hydrogenation reaction, the liquid hourly space velocity (LHSV) of the liquid feed over the catalyst was 4 h$^{-1}$. When the decalin/tallow/DMDS feed was fed to the reactor, hydrogen gas was also introduced, such that the ratio of $H_2$ gas volume to liquid feedstock volume was maintained at a value of 200 Nm$^3$/m$^3$ (gas volume at 15.6° C. and 1 atm). Reaction was maintained over a period of 5 days. Liquid samples were collected daily and analysed according to a chromatographic method described in ASTM D2887, and also by GCMS. Gaseous off-gas samples were analysed using gas chromatography. The quantity of liquid product was determined gravimetrically. Off-gas volume was measured using a wet-test flow meter.

The mass balance calculated from the quantities of the identified components of the obtained liquid and gaseous products was 99% with 1% standard deviation. The carbon balance was 100% with 1% standard deviation. From these results, it is clear that, for both experiments, no detectable quantities of unconverted tallow oil were observed in the liquid product, and hence operation at lower pressure did not reduce conversion of tallow oil to product hydrocarbons.

EXAMPLE 2

The same procedure as Example 1 was followed, except that the reactor pressure was maintained at 100 barg (10.1 MPa).

TABLE 1

Products in the liquid phase for tallow hydrogenation experiments.

| Compound | Carbon atoms | Example 1 (30 barg) | Example 2 (100 barg) |
|---|---|---|---|
| Heptane | | 0.03 | 0.10 |
| Octane | | 0.04 | 0.02 |
| Cyclohexane, 1,3,5-trimethyl- | | | 0.02 |
| Nonane | | 0.10 | 0.03 |
| Decane | | 0.13 | |
| Naphthalene, decahydro-, trans- (decalin) | | 45.75 | 46.32 |
| 1,1'-Bicyclopentyl | | | 0.08 |
| Naphthalene, decahydro-, cis-(decalin) | | 26.82 | 27.49 |
| 2-Methyldecalin (probably trans) | | | 0.02 |
| Unknown | | 0.12 | 0.03 |
| Naphthalene, decahydro-2-methyl- | | | 0.01 |
| Naphthalene, 1,2,3,4-tetrahydro- (tetralin) | | 1.37 | 0.45 |
| Unknown | | | 0.02 |
| Naphthalene | | 0.45 | 0.02 |
| Unknown | | 0.04 | 0.03 |
| Dodecane | 12 | 0.08 | 0.05 |
| Dodecane, 2-methyl- | 13 | 0.04 | 0.02 |
| Tridecane | 13 | 0.70 | 0.43 |
| Tridecane, 2-methyl- | 14 | 0.10 | 0.07 |
| Tridecane, 3-methyl- | 14 | 0.08 | 0.05 |
| Tetradecane | 14 | 0.59 | 0.51 |
| Tetradecane, 2-methyl- | 15 | 0.13 | 0.11 |
| Tetradecane, 3-methyl- | 15 | 0.05 | 0.05 |
| Pentadecane | 15 | 3.95 | 2.92 |
| Dodecane, 2-methyl-8-propyl- | 16 | 0.12 | |
| Pentadecane, 2-methyl- | 16 | | 0.10 |
| Pentadecane, 3-methyl- | 16 | 0.11 | 0.08 |

TABLE 1-continued

Products in the liquid phase for tallow hydrogenation experiments.

| Compound | Carbon atoms | Example 1 (30 barg) | Example 2 (100 barg) |
|---|---|---|---|
| Hexadecane | 16 | 2.83 | 3.57 |
| unknown | | 0.05 | 0.03 |
| unknown | | | 0.03 |
| Hexadecane, 2-methyl- | 17 | 0.07 | 0.08 |
| Hexadecane, 3-methyl- | 17 | 0.09 | 0.09 |
| Heptadecane | 17 | 9.50 | 7.90 |
| Pentadecane, 2,6,10-trimethyl- | 18 | 0.08 | |
| Heptadecane, 2-methyl- | 18 | | 0.06 |
| Heptadecane, 3-methyl- | 18 | | 0.03 |
| Cyclohexane, undecyl- | 17 | | 0.03 |
| 1-Octadecene | 18 | | 0.03 |
| Docosane | 22 | | 0.03 |
| Octadecane | 18 | 6.01 | 8.80 |
| Hexadecane, 2,6-dimethyl- | 18 | 0.04 | |
| Hexadecane, 2,6,10,14-tetramethyl- | 20 | | 0.06 |
| Nonadecane | 19 | 0.15 | 0.14 |
| Eicosane | 20 | 0.08 | 0.08 |
| Eicosane, 2-methyl- | 20 | 0.04 | 0.03 |
| Docosane | 22 | 0.04 | 0.02 |
| Tricosane | 23 | 0.04 | 0.01 |
| Tetracosane | 24 | 0.05 | |
| Pentacosane | 25 | 0.06 | |
| Hexacosane | 26 | 0.10 | |
| TOTAL | | 100.00 | 100.00 |

EXAMPLE 3

The same procedure as Example 1 was followed, except that the feed was 99.74% decalin and 0.26% DMDS (i.e. no tallow). The LHSV was 2 h$^{-1}$.

The resulting compositions of the liquid product streams at the end of day 5 for each of experiments 1 and 2 are shown in table 1. From Example 3, decalin was shown to produce tetralin and naphthalene, but no other hydrocarbons.

Liquid hydrocarbon yield was between 94 and 95% based on the total liquid feed. Tallow-derived products constituted 26% by weight of the liquid products, which represents a liquid product yield from tallow of approximately 81 wt %.

Table 2 shows the distribution of carbon numbers of fatty acid groups present in a typical sample of tallow oil. Only even-numbered chains (which includes the carboxyl group) are present.

TABLE 2

Typical distribution of fatty acid groups in tallow oil.

| Number of Carbon atoms in Fatty Acid Groups[a] | Percentage in Tallow Oil (wt %) |
|---|---|
| C12 | 0.5 |
| C14 | 3.6 |
| C16 | 27.7 |
| C18 | 62.5 |
| C20 | 0.4 |
| C22 | 0.04 |

[a]Including carboxyl group.

Table 3 shows the distribution of hydrocarbons produced from the tallow, demonstrating that the distribution of tallow-derived hydrocarbons in the product is consistent with distribution of the fatty acid chains in the tallow oil.

TABLE 3

Distribution of hydrocarbons derived from tallow.

| Hydrocarbon Ratio | Example 1 30 Barg | Example 2 100 Barg |
|---|---|---|
| (C13 + C14)/(C13 to C18) | 5% | 4% |
| (C15 + C16)/(C13 to C18) | 29% | 27% |
| (C17 + C18)/(C13 to C18) | 66% | 69% |

Table 4 shows the extent of production of $R^1H$ product hydrocarbons compared to $R^1CH_3$ product hydrocarbons under the two different sets of conditions.

TABLE 4

Comparison of carbon atoms in the product hydrocarbons derived from tallow oil.

| $R^1H/(R^1H + R^1CH_3)$ | Example 1 (30 barg) | Example 2 (100 barg) |
|---|---|---|
| C13/(C13 + C14) | 54% | 46% |
| C15/(C15 + C16) | 58% | 45% |
| C17/(C17 + C18) | 61% | 47% |

The results show that $R^1H$ product hydrocarbons are favoured at lower reaction pressures, and lower hydrogen partial pressures, which are produced by a less hydrogen-consuming reaction pathway.

Table 5 shows the analysis of the gaseous products from examples 1, 2 and 3. Total $C_1$ yield and carbon dioxide yield are clearly higher at the lower reaction pressure.

TABLE 5

Yield of gaseous components.

| | Yield | | |
|---|---|---|---|
| | Example 1 | Example 2 | Example 3 |
| Pressure BarG | 30 | 100 | 30 |
| Carbon Dioxide (wt % of Tallow) | 1.51 | 0.62 | 0.00[a] |
| Carbon Monoxide (wt % of Tallow) | 0.49 | 0.16 | 0.00[a] |
| Methane (wt % of Tallow) | 0.13 | 0.30 | 0.02[a] |
| Total "C1-Carbon" (wt % of Tallow) | 2.40 | 1.52 | |
| Max theoretical "C1" wt % on Tallow | 4.18 | 4.18 | |
| mol % of tallow carboxyl groups converted to "C1" compounds | 57 | 37 | |
| Total "C1-Carbon" (wt % of Total Feed) | 0.72 | 0.46 | |
| $CO_2/(CO_2 + CO + CH_4)$ mole ratio | 0.57 | 0.37 | |
| $CO_2/(CO + CH_4)$ mole ratio | 1.334 | 0.58 | |

[a]wt % decalin.

These results show that the lower pressure reaction produces not only more carbon dioxide than the higher pressure reaction, but also the proportion of carbon dioxide to hydrogenated by-products thereof (i.e. carbon monoxide and methane) is also higher under lower pressure reaction conditions. Furthermore, lower pressure operation results in a greater proportion of carboxyl groups being converted to $CO_2$ and other $C_1$ compounds.

EXAMPLE 4

This example used the same refinery-derived gas-oil as used in the conditioning stage of Example 1. Also used was rapeseed oil, mainly comprising fatty acid groups having 18 carbon atoms (including the carboxyl carbon) with 1, 2 or 3 double bonds per fatty acid moiety. The particular oil selected in this Example was very low in erucic fatty acid content (22 carbon atoms). The same presulphided catalyst as Example 1 was used.

The experiment comprised three stages, each lasting for a period of 5 days. The first stage was to use the gas oil as the only liquid feed in order to condition the catalyst, the second stage was a continuation of the first, but with product analysis at regular intervals, and the final stage was to replace the pure gas oil feed with a 70:30 wt % mixture of gas oil and rapeseed oil. The oxygen content of the mixed gas oil/rapeseed oil liquid feed was 3 wt %, with a negligible contribution from the gas oil. A LHSV of 4 h$^{-1}$ and a pressure of 30 barg (3.1 MPa) were maintained throughout the course of the experiment. In stages 2 and 3, hydrogen was additional fed to the reactor with a H$_2$:oil ratio of 200 Nm$^3$/m$^3$. The temperature was 350° C. during stages 1 and 2, and 383° C. during the third stage.

An increase in both $C_{17}$ and $C_{18}$ hydrocarbons was noticeable in the GC trace of the product hydrocarbons compared to the gas-oil feed when rapeseed oil was present in the reactor feed.

EXAMPLE 5

This was conducted in the same way as Example 4, with the exception that tallow oil was used in place of rapeseed oil, and a temperature of 363° C. was maintained throughout all three stages of the experiment. The oxygen content of the mixed gas oil/tallow oil feed was 3 wt %.

The addition of tallow oil to the liquid gas oil feed resulted in a measurable increase of 23 wt % of $C_{15}$ to $C_{18}$ hydrocarbons in the liquid product, giving a diesel fuel yield from the tallow of 75 wt %. The molar ratio of $(C_{15}+C_{16}):(C_{17}+C_{18})$ hydrocarbons was approximately 1:2, reflecting the ratio of $C_{16}:C_{18}$ fatty acid units of the tallow oil.

The molar ratios of hydrocarbons with odd and even numbers, i.e. the $C_{15}:C_{16}$ and the $C_{17}:C_{18}$ ratios, were approximately 1:1, suggesting that 50% of the fatty acid groups decompose via decarboxylation (equation 1) and 50% by hydrogenation (equation 2) under the conditions employed.

In both Experiments 4 and 5, the liquid product obtained during stage 2 was low sulphur diesel, typically containing between 50 and 100 ppm sulphur (expressed as elemental sulphur). The gas-phase product of the reaction comprised primarily unreacted hydrogen and H$_2$S, with trace amounts of light hydrocarbons.

When the biological oil was added to the gas oil during stage 3 of each experiment, the liquid product also comprised approximately 2 wt % of an aqueous component, and the gas-phase product additionally comprised propane, CO, CO$_2$ and methane. The oxygen content of the non-aqueous portion of the liquid phase product was less than 0.03 wt %. The aqueous phase comprised minor amounts of organic components, which were primarily light carboxylic acids with a total concentration in the water of less than 100 ppm.

The invention claimed is:

1. A process for producing hydrocarbons from a carboxylic acid and/or derivative thereof, which process comprises the steps of:
   a. feeding hydrogen and a reaction composition comprising a carboxylic acid and/or derivative thereof to a reactor;
   b. maintaining conditions within the reactor such that the hydrogen reacts with the carboxylic acid and/or derivative thereof to produce one or more C1 compounds selected from one or more of carbon monoxide (CO), carbon dioxide (CO2) and methane (CH4), and one or more product hydrocarbons derived from the carboxylic acid and/or derivative thereof, in which the reaction between hydrogen and the carboxylic acid and/or derivative thereof is catalysed using a supported CoMo catalyst, wherein the total pressure in the reactor is 31 bara (3.1 MPa) or less and wherein the reaction temperature is in the range of from 200 to 430° C.;
   c. removing from the reactor a product stream comprising unreacted hydrogen, the one or more C1 compounds, and one or more product hydrocarbons;
   d. feeding the product stream to a flash separator, from which a vapour fraction comprising C1 compounds and unreacted hydrogen is separated from a liquid fraction comprising the one or more product hydrocarbons; and
   e. recycling at least a portion of the unreacted hydrogen in the vapour fraction to the reactor;
   wherein the process comprises controlling one or more of the total pressure in the reactor, the hydrogen partial pressure in the reactor, the reaction temperature, the molar ratio of carboxylate groups to hydrogen in the reactor and the space velocity of the reaction composition over the catalyst such that: the molar ratio of C1 compounds produced by the reaction to the carboxylate groups present in the carboxylic acid and/or derivative thereof in the reaction composition as fed to the reactor is maintained above a value of 0.37:1, and the mole ratio of carbon dioxide to the sum of carbon monoxide and methane is maintained above a value of 0.58:1.

2. A process as claimed in claim 1, in which the product hydrocarbons have boiling points in the diesel fuel boiling range and/or have in the range of from 10 to 22 carbon atoms.

3. A process as claimed in claim 1, in which the carboxylic acid and/or derivative thereof is derived from a biological oil or fat.

4. A process as claimed in claim 1, in which the reaction pressure is less than 100 bara (10 MPa).

5. A process as claimed in claim 4, in which the reaction pressure is less than 50 bara (5 MPa).

6. A process as claimed in claim 1, in which the catalyst comprises Mo in combination with Co or Ni.

7. A process as claimed in claim 6, in which the catalyst is CoMo supported on gamma-alumina.

8. A process as claimed in claim 1, in which the quantities of C$_1$ components are measured in the vapour fraction of the flash separator.

9. A process as claimed in claim 1, in which carbon dioxide is removed from the vapour fraction before recycling at least a portion of the unreacted hydrogen to the reactor.

10. A process as claimed in claim 9, in which carbon dioxide removed from the vapour fraction is captured for sequestration.

11. A process as claimed in claim 1, in which the vapour fraction is contacted with a selective hydrogen-permeable membrane, in which hydrogen is separated and recycled to the reactor.

12. A process as claimed in claim 1, in which the liquid fraction from the flash separator is fed to a fractionation column to produce two or more fractions, at least one of which comprises hydrocarbons in the diesel fuel boiling range.

13. A process as claimed in claim 1, in which the reaction composition additionally comprises feedstock hydrocarbons.

14. A process as claimed in claim 13, in which the feedstock hydrocarbons are derived from a crude oil refinery, and have boiling points in the diesel fuel boiling range.

15. A process as claimed in claim 14, in which the feedstock hydrocarbons additionally comprise sulphur compounds, at least some of which are converted to $H_2S$ in the reactor.

16. A process as claimed in claim 15, in which the feedstock hydrocarbons have boiling points in the diesel fuel boiling range, and form part of the liquid fraction from the flash separator.

17. A process as claimed in claim 15, in which the feedstock hydrocarbons additionally comprise sulphur compounds, and $H_2S$ is separated from the product stream in the vapour fraction of the flash separator.

18. A process as claimed in claim 17, in which at least a portion of the unreacted hydrogen in the vapour fraction is recycled to the reactor, and $H_2S$ is removed from the vapour fraction before the unreacted hydrogen is recycled to the reactor.

* * * * *